United States Patent
Lee et al.

(10) Patent No.: US 9,742,964 B2
(45) Date of Patent: Aug. 22, 2017

(54) AUDIO/VISUAL DEVICE AND CONTROL METHOD THEREOF

(71) Applicant: SAMSUNG ELECTRONICS CO., LTD., Suwon-si (KR)

(72) Inventors: Byeong-hu Lee, Suwon-si (KR); Myoung-ho Kim, Suwon-si (KR); Yong-hee Park, Suwon-si (KR); Jung-sub Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/464,001

(22) Filed: Aug. 20, 2014

(65) Prior Publication Data

US 2015/0195428 A1    Jul. 9, 2015

(30) Foreign Application Priority Data

Jan. 7, 2014  (KR) .................. 10-2014-0001831

(51) Int. Cl.
*H04N 9/475* (2006.01)
*H04N 5/05* (2006.01)
(Continued)

(52) U.S. Cl.
CPC ............. *H04N 5/05* (2013.01); *H04N 5/0675* (2013.01); *H04N 21/4307* (2013.01);
(Continued)

(58) Field of Classification Search
USPC ....... 348/515, 552, 500, 505, 508, 510, 512, 348/516, 518, 211.9, 231.4, 300, 423.1,
(Continued)

(56) References Cited

U.S. PATENT DOCUMENTS 5,928,342 A    7/1999 Rossum et al.
6,154,548 A *  11/2000 Bizzan .................. H03G 3/348
                                                                381/94.5
(Continued)

FOREIGN PATENT DOCUMENTS

CN    1725864 A    1/2006
CN    1973536 A    5/2007
(Continued)

OTHER PUBLICATIONS

Communication issued on Jun. 3, 2015 by the European Patent Office in related Application No. 15150380.2.
(Continued)

*Primary Examiner* — Michael Lee
*Assistant Examiner* — Mustafizur Rahman
(74) *Attorney, Agent, or Firm* — Sughrue Mion, PLLC

(57) ABSTRACT

An AV device including a first signal transmitter configured to output a video signal and a first audio signal corresponding to the video signal to a display device; a first signal receiver configured to receive a feedback signal of the first audio signal from the display device; a second signal transmitter configured to output a second audio signal corresponding to the video signal; and a controller configured to determine a processing delay time of the display device by comparing the first audio signal and the feedback signal, and control the second signal transmitter to delay the output of the second audio signal based on the determined processing delay time.

16 Claims, 7 Drawing Sheets

(51) Int. Cl.
  *H04N 21/43* (2011.01)
  *H04N 21/436* (2011.01)
  *H04N 21/439* (2011.01)
  *H04N 5/067* (2006.01)
(52) U.S. Cl.
  CPC ..... *H04N 21/4392* (2013.01); *H04N 21/4394* (2013.01); *H04N 21/43615* (2013.01)
(58) Field of Classification Search
  USPC ......... 348/425.4, 429.1, 462, 480, 482, 636, 348/680, 693, 705, 706, 707, 723, 725; 725/78, 88, 89, 116; 455/550.1, 563, 455/3.06; 370/324, 350, 503; 381/26, 381/61, 94.5, 96
  See application file for complete search history.

(56) References Cited

U.S. PATENT DOCUMENTS

| | | | | |
|---|---|---|---|---|
| 7,480,008 | B2* | 1/2009 | Kim | H04N 21/4341 348/515 |
| 7,982,803 | B2* | 7/2011 | Lee | H04N 5/04 348/423.1 |
| 8,451,375 | B2* | 5/2013 | Ejima | H04N 21/2368 348/512 |
| 2002/0035729 | A1* | 3/2002 | Diep | H04N 7/106 725/78 |
| 2003/0147008 | A1* | 8/2003 | Liu | G06F 1/1626 348/552 |
| 2004/0120535 | A1* | 6/2004 | Woods | H04R 3/007 381/96 |
| 2005/0272496 | A1* | 12/2005 | Reinish | A63B 63/00 463/2 |
| 2006/0012710 | A1* | 1/2006 | Sasaki | G11B 27/10 348/515 |
| 2006/0089735 | A1 | 4/2006 | Atkinson | |
| 2006/0140265 | A1 | 6/2006 | Igler et al. | |
| 2006/0149850 | A1 | 7/2006 | Bowman | |
| 2006/0218603 | A1* | 9/2006 | Kanehira | H04N 7/17318 725/89 |
| 2006/0242314 | A1 | 10/2006 | Logvinov et al. | |
| 2006/0290810 | A1* | 12/2006 | Mallinson | H04N 5/04 348/515 |
| 2007/0091122 | A1* | 4/2007 | Nagano | H04N 5/04 345/629 |
| 2007/0129098 | A1* | 6/2007 | Cheng | H04M 1/7258 455/550.1 |
| 2007/0137988 | A1* | 6/2007 | Yu | G06F 3/14 200/4 |
| 2007/0169163 | A1* | 7/2007 | Morio | H04H 20/38 725/131 |
| 2007/0223874 | A1* | 9/2007 | Hentschel | G11B 27/10 386/203 |
| 2008/0056154 | A1* | 3/2008 | Firestone | H04L 12/66 370/252 |
| 2008/0252782 | A1* | 10/2008 | Komeno | G09G 5/12 348/512 |
| 2009/0089813 | A1* | 4/2009 | Wihardja | G06F 3/165 719/322 |
| 2009/0091655 | A1 | 4/2009 | Russell et al. | |
| 2009/0135856 | A1 | 5/2009 | Gha et al. | |
| 2009/0220106 | A1* | 9/2009 | Sakai | H03G 3/00 381/94.5 |
| 2009/0290064 | A1* | 11/2009 | Matsumoto | H04S 3/00 348/515 |
| 2010/0042239 | A1* | 2/2010 | Moore | H04N 21/4143 700/94 |
| 2010/0054341 | A1 | 3/2010 | Yoshimura et al. | |
| 2010/0067877 | A1* | 3/2010 | Ichimura | H04N 21/4307 386/239 |
| 2010/0128176 | A1* | 5/2010 | Nakajima | G09G 5/006 348/512 |
| 2010/0295870 | A1 | 11/2010 | Baghdadi et al. | |
| 2010/0315553 | A1* | 12/2010 | Takatsuji | G06F 21/10 348/516 |
| 2011/0176060 | A1* | 7/2011 | Lee | H04L 1/0001 348/723 |
| 2011/0187927 | A1* | 8/2011 | Simon | H04N 21/4307 348/500 |
| 2012/0133829 | A1* | 5/2012 | Nakade | H04N 5/04 348/515 |
| 2012/0182384 | A1* | 7/2012 | Anderson | H04L 12/1827 348/14.09 |
| 2012/0206566 | A1* | 8/2012 | Fedoseyeva | G06Q 10/06398 348/38 |
| 2012/0224100 | A1 | 9/2012 | Gha et al. | |
| 2012/0237059 | A1* | 9/2012 | Saito | G06F 3/165 381/120 |
| 2012/0237184 | A1 | 9/2012 | Takeuchi | |
| 2013/0002953 | A1* | 1/2013 | Noguchi | H04N 21/2368 348/515 |
| 2013/0212507 | A1* | 8/2013 | Fedoseyeva | G06Q 10/00 715/765 |
| 2013/0212521 | A1* | 8/2013 | Fedoseyeva | G06Q 10/00 715/781 |
| 2013/0294609 | A1* | 11/2013 | Tackett | H04R 29/007 381/56 |
| 2016/0234544 | A1* | 8/2016 | Huang | H04N 21/2368 |

FOREIGN PATENT DOCUMENTS

| | | |
|---|---|---|
| EP | 2063662 A2 | 5/2009 |
| JP | 2004-320424 A | 11/2004 |
| JP | 2006-217006 A | 8/2006 |
| JP | 2008-301087 A | 12/2008 |
| JP | 2009-89056 A | 4/2009 |
| JP | 2010-62947 A | 3/2010 |
| JP | 4638927 B2 | 2/2011 |
| JP | 2012-191583 A | 10/2012 |
| JP | 2013-207307 A | 10/2013 |
| KR | 10-2006-0033287 A | 4/2006 |

OTHER PUBLICATIONS

Communication issued on Jul. 10, 2015 by the European Patent Office in related Application No. 15150380.2.
Communication dated Nov. 17, 2015 issued by Japanese Intellectual Property Office in counterpart Japanese Application No. 2014-256857.
Office Action dated Aug. 2, 2016, issued by the Japanese Patent Office in counterpart Japanese Patent Application No. 2014-256857.
Communication dated Jun. 1, 2017, issued by the State Intellectual Property Office of P.R. China in counterpart Chinese Application No. 201510002260.7.

* cited by examiner

AUDIO/VISUAL DEVICE AND CONTROL METHOD THEREOF

CROSS-REFERENCE TO RELATED APPLICATION

This application claims priority from Korean Patent Application No. 10-2014-0001831, filed on Jan. 7, 2014 in the Korean Intellectual Property Office, the disclosure of which is incorporated herein by reference in its entirety.

BACKGROUND

Field

Apparatuses and methods consistent with exemplary embodiments relate to an audio/video (AV) device and a control method thereof, and more particularly, to an AV device, which outputs a video signal and an audio signal, and a control method thereof.

Description of the Related Art

An A/V device, such as a home theater system, an AV receiver, etc., receives a video signal and an audio signal from a source device, processes the received video and audio signals, and outputs the processed video signal to a display device and the audio signal to a sound output device. The display device receives and processes the output video signal and displays the process video signal as an image. The sound output device outputs a sound based on the audio signal.

However, the video signal is processed in the display device, and the audio signal is separately processed in the AV device and output to the sound output device. Therefore, synchronization is very important between the video signal and the audio signal. If time taken to process and output the audio signal in the AV device is longer than time taken to process the video signal in the display device, the image displayed on the display device is not synchronized with the sound output from the sound output device and displayed later than the sound.

To solve such asynchronism and a delay between the image and the sound, a compensation process for the delay may be applied to the AV device, the display device, etc. For example, a user may manually set the delay while viewing and listening to the image and the sound, to such an extent that the image and the sound are synchronized with each other based on the user's own determination. In this case, the extent of the compensation for the delay depends on a user's subjective determination, and it is thus difficult to guarantee the accuracy and reliability of the compensation. Also, such compensation is invariable, and it is difficult to apply the compensation to a case where the delay is varied depending on the types of contents to be reproduced, resolution, and characteristics of the devices.

SUMMARY

One or more exemplary embodiments may provide an AV device, which can output a video signal and an audio signal while compensating for a delay with high accuracy and reliability, and a control method thereof.

One or more exemplary embodiments also provide an AV device, which can output a video signal and an audio signal while effectively compensating for a delay even though the delay is varied depending on types of contents to be reproduced, resolution, and characteristics of devices, and a control method thereof.

According to an aspect of an exemplary embodiment, there is provided an audio/video (AV) device including: a first signal transmitter configured to output a video signal and a first audio signal corresponding to the video signal to a display device; a first signal receiver configured to receive a feedback signal of the first audio signal from the display device; a second signal transmitter configured to output a second audio signal corresponding to the video signal; and a controller configured to determine a processing delay time of the display device by comparing the first audio signal and the feedback signal, and control the second signal transmitter to delay the output of the second audio signal based on the determined processing delay time.

The first audio signal may include at least one discrimination section, and the controller may be further configured to determine the processing delay time based on a difference in phase between the first audio signal and the feedback signal with respect to the discrimination section.

The discrimination section may be periodically provided.

The discrimination section may include a section from which sound is eliminated.

The controller may be further configured to control the first signal transmitter to output control the first audio signal to be output in response to an audio change occurring.

The controller may be further configured to determine that the audio change occurs in response to a user's input being received.

The AV device may further include a second signal receiver configured to receive the video signal and the audio signal from a source device, wherein the controller may be further configured to determine that the audio change occurs in response to the received video signal or audio signal being changed.

The AV device may further include a signal processor configured to process the second audio signal, wherein the controller may be further configured to control the second signal transmitter to output the second audio signal on a processing delay time of the display device and a processing delay time of the signal processor.

The first signal receiver may comply with a Sony/Philips Digital Interface (S/PDIF) standard.

According to an aspect of another exemplary embodiment, there is a method of controlling an audio/video (AV) device, the method including: outputting a video signal and a first audio signal corresponding to the video signal to a display device; receiving a feedback signal of the first audio signal from the display device; determining a processing delay time of the display device by comparing the first audio signal and the feedback signal; and outputting a second audio signal corresponding to the video signal, the second audio signal being delayed based on the determined processing delay time.

The first audio signal may include at least one discrimination section, and the determining the processing delay time may include determining the processing delay time based on a difference in phase between the first audio signal and the feedback signal with respect to the discrimination section.

The discrimination section may be periodically provided.

The discrimination section may include a section from which sound is eliminated.

The outputting the first audio signal may include outputting the first audio signal in response to an audio change occurring.

The outputting the first audio signal may include determining that the audio change occurs in response to a user's input being received.

The method may further include receiving the video signal and the audio signal from a source device, wherein the outputting the first audio signal includes determining that the audio change occurs in response to the received video signal or audio signal being changed.

The method may further include processing the second audio signal, wherein the outputting the second audio signal includes outputting the second audio signal based on a processing delay time of the display device and a processing delay time of the second audio signal.

The receiving the feedback signal may include receiving the feedback signal complying with a Sony/Philips Digital Interface (S/PDIF) standard.

According to an aspect of another exemplary embodiment, there is provided an audio/video (AV) apparatus including: a first signal transmitter; a second signal transmitter; and a controller configured to determine a processing delay time of a display device by controlling the first signal transmitter to transmit a first signal to the display device and calculating the processing delay time by comparing the first signal to a feedback signal received from the display device, control the first signal transmitter to transmit a first video signal to the display device, and control the second signal transmitter to transmit to an audio output device a first audio signal synchronized with the first video signal by compensating a timing of the transmission of the first audio signal based on the determined processing delay time.

The first signal may comprise a second video signal and a second audio signal.

The controller may be further configured determine the processing delay time of the display device in response to at least one of a user input being received, a change in audio occurring, a change in the first video signal occurring, or second audio signal occurring.

According to another exemplary embodiment, there is a method of synchronizing an audio signal with a video signal by an audio/video (AV) device, the method including: determining a processing delay time of a display device by transmitting a first signal to the display device and calculating the processing delay time by comparing the first signal to a feedback signal received from the display device; and compensating a timing of transmission of a first audio signal synchronized with a first video signal based on the determined processing delay time.

The first signal may comprise a second video signal and a second audio signal.

The determining and the compensating may be performed in response to at least one of a user input being received, a change in audio occurring, a change in the first video signal occurring, or second audio signal occurring.

BRIEF DESCRIPTION OF THE DRAWINGS

The above and/or other aspects will become apparent and more readily appreciated from the following description of exemplary embodiments, taken in conjunction with the accompanying drawings, in which.

DETAILED DESCRIPTION OF EXEMPLARY EMBODIMENTS

Figure 1:
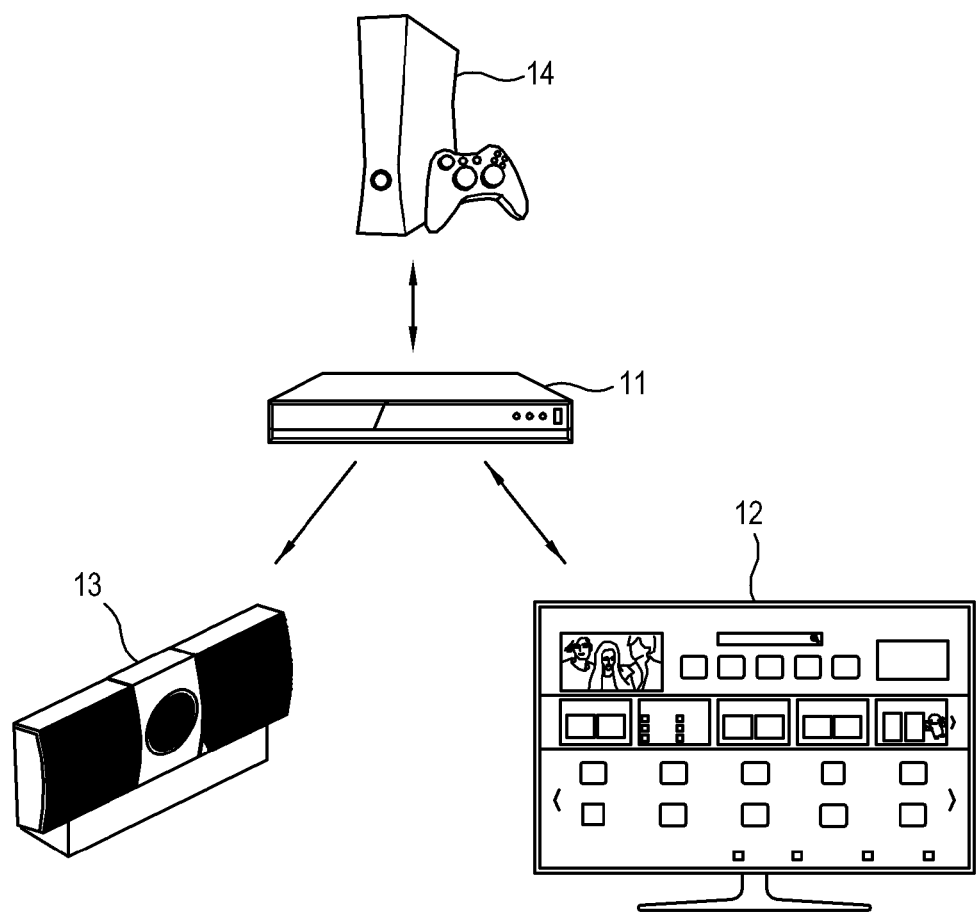
FIG. 1 illustrates an AV device according to an exemplary embodiment.

Below, exemplary embodiments will be described in detail. FIG. 1 illustrates an audio/video (AV) device according to an exemplary embodiment. The AV device 11 according to an exemplary embodiment may be achieved by a home theater system, an AV receiver, or the like device. The AV device 11 processes a video signal and an audio signal, and outputs the processed video signal to a display device 12 and the processed audio signal to a sound output device 13. The display device 12 may be, as a non-limiting example, a television (TV) or the like, and the sound output device 13 may, as a non-limiting example, by a loudspeaker system. The AV device 11 may receive the video signal and the audio signal from a source device 14. The source device 14 may be, as non-limiting examples, a digital versatile disc (DVD) player, a Blu-ray disc (BD) player, a personal computer (PC), a smart phone, a smart pad, a game console, etc. The source device 14 can transmit the video signal and the audio signal of multimedia contents (hereinafter, also referred to as a 'content') to the AV device 11. The display device 12 receives and processes the video signal from the AV device 11 and displays it as an image. The sound output device 13 receives the audio signal from the AV device 11 and outputs sound based on the audio signal.

The display device 12 may perform image processing, e.g., image-quality enhancement with regard to the video signal received from the AV device 11. The AV device 11 compensates for a delay that may occur due to the image processing with regard to the video signal of the display device 12. The AV device 11 determines a processing delay time due to the image processing of the display device 12, and delays the audio signal output to the sound output device 13, in comparison to the video signal output to the display device 12, based on the determined processing delay time, thereby outputting the delayed audio signal. Through the delay compensation in the AV device 11, the image displayed on the display device 12 and the sound output from the sound output device 13 can be synchronized with each other.

Specifically, the AV device 11 transmits a first signal to the display device 12, and receives a feedback signal of the first audio signal from the display device 12, thereby determining the processing delay time due to the image processing of the display device 12 based on the received feedback signal. The first signal may include an audio signal (hereinafter, also referred to as a 'first audio signal') for determining the delay, together with a video signal, and the feedback signal may be a feedback signal of the first audio signal. Thus, the AV device 11 according to an exemplary embodiment employs the first audio signal and its feedback signal to determine the processing delay time, thereby performing the delay compensation with accuracy and reliability higher than those of the delay compensation based on a user's subjective determination. Also, the AV device 11 according to an exemplary embodiment determines the processing delay time in real time whenever contents are reproduced, thereby effectively compensating the delay even when a delayed degree is varied depending on the types of contents to be reproduced, resolution, characteristics of the display device 12, etc.

Also, the delay compensation of the AV device 11 according to an exemplary embodiment can be performed independently of the characteristic of the display device 12, and thus may be more universally compatible with various display devices 12 manufactured by various manufacturers than if getting information about the processing delay time determined by the display device 12 from the display device 12.

Figure 2:
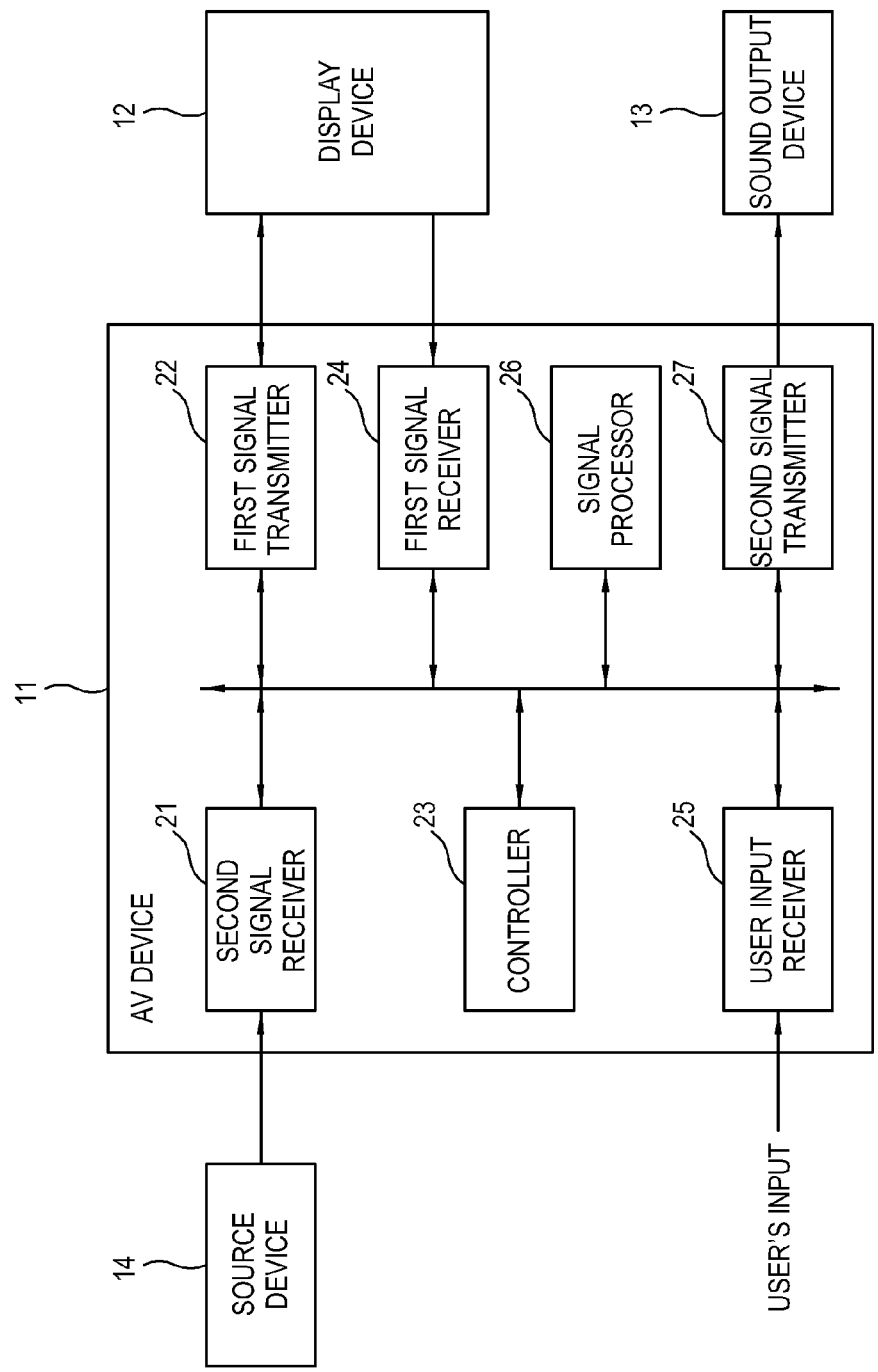
FIG. 2 is a block diagram of the AV device according to an exemplary embodiment.

FIG. 2 is a block diagram of the AV device 11 according to an exemplary embodiment. As shown in FIG. 2, the AV device 11 may include a first signal transmitter 22, i.e., a first signal output, a first signal receiver 24, a signal processor 26, a second signal transmitter 27, i.e., a second signal output, and a controller 23. The AV device 11 may further include a second signal receiver 21 to receive the video signal and the audio signal from the source device 14. The first signal transmitter 22 outputs the video signal and the first audio signal to the display device 12. The first signal transmitter 22 outputs the video signal received from the second signal receiver 21 to the display device 12. The first signal transmitter 22 outputs the first audio signal obtained from the audio signal received from the second signal receiver 21 to the display device 12. The first audio signal is synchronized with the video signal output together.

The first signal receiver 24 receives the feedback signal of the first audio signal from the display device 12. The feedback signal received in the first signal receiver 24 refers to a signal obtained by making the first audio signal output to the display device 12 pass through the display device 12. The first signal receiver 24 may receive the feedback signal of the first audio signal in accordance with standards of Sony/Philips Digital Interface (S/PDIF), as a non-limiting example. The S/PDIF standard is one of the standards for the digital terminal, and makes it possible to transmit sound data of multi-channels through one cable.

The signal processor 26 processes the video signal or the audio signal. Specifically, the signal processor 26 performs sound processing with regard to the audio signal received from the source device 14. The sound processing may for example include sound-quality enhancement processing, equalizing processing, sound effect processing, etc. Also, the signal processor 26 may perform image processing with regard to the video signal.

The second signal transmitter 27 outputs the audio signal received from the source device 14 to the sound output device 13. Specifically, the second signal transmitter 27 may output an audio signal, which is acquired by compensating for the delay under control of the controller 23 (hereinafter, also referred to as a 'second audio signal'), to the sound output device 13. According to another exemplary embodiment, the AV device 11 may not include the second signal transmitter 27, or may further include a loudspeaker for outputting sound based on the delay-compensated second audio signal, together with the second signal transmitter 27.

The controller 23 compares the first audio signal output to the display device 12 with the feedback signal received from the display device 12 to determine the processing delay time of the display device 12, and controls the second audio signal to be output as being delayed, in comparison to the video signal, based on the determined processing delay time. The controller 23 may include a control program for performing the foregoing control. The controller 23 may include a control program for performing such control, nonvolatile and volatile memories for storing the entire or a part of the control program, and a microprocessor for executing the control program.

Figure 3:
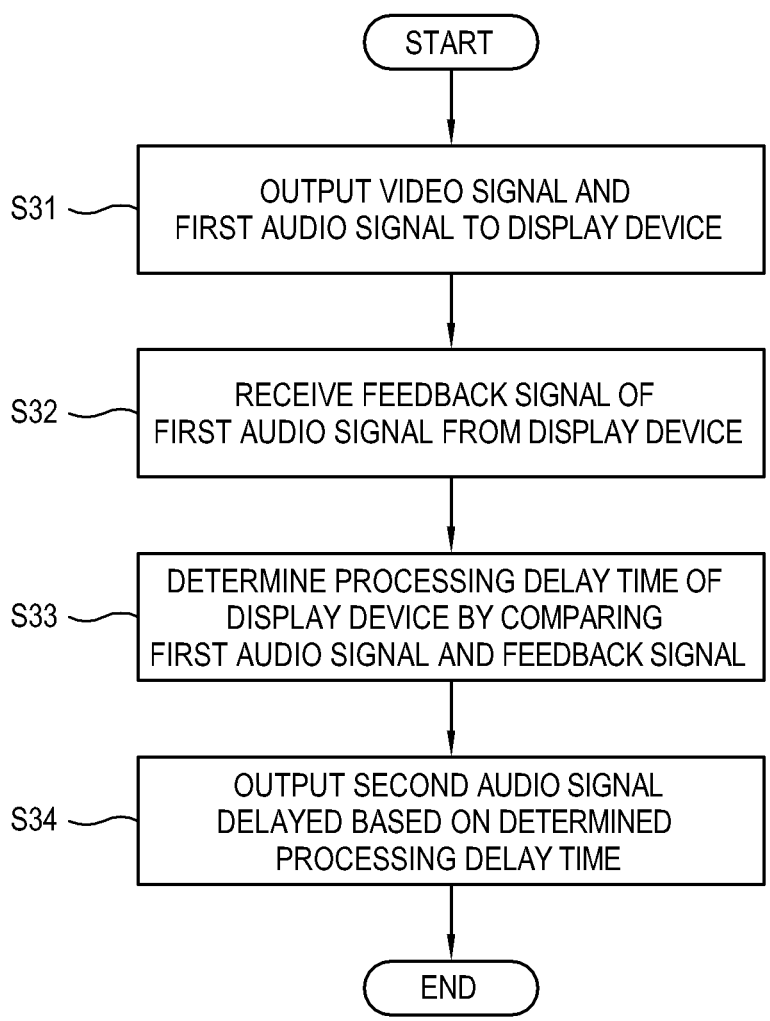
FIG. 3 is a flowchart showing operations of the AV device according to an exemplary embodiment.

FIG. 3 is a flowchart showing operations of the AV device 11 according to an exemplary embodiment. First, at operation S31, the AV device 11 outputs the video signal and the first audio signal to the display device 12. Next, at operation S32, the AV device 11 receives the feedback signal of the first audio signal from the display device 12. Next, at operation S33, the AV device 11 compares the first audio signal output to the display device 12 with the feedback signal received from the display device 12 and therefore determines the processing delay time of the display device 12. Next, at operation S34, the AV device 11 outputs the second audio signal delayed, in comparison to the video signal, based on the determined processing delay time.

Figure 4:
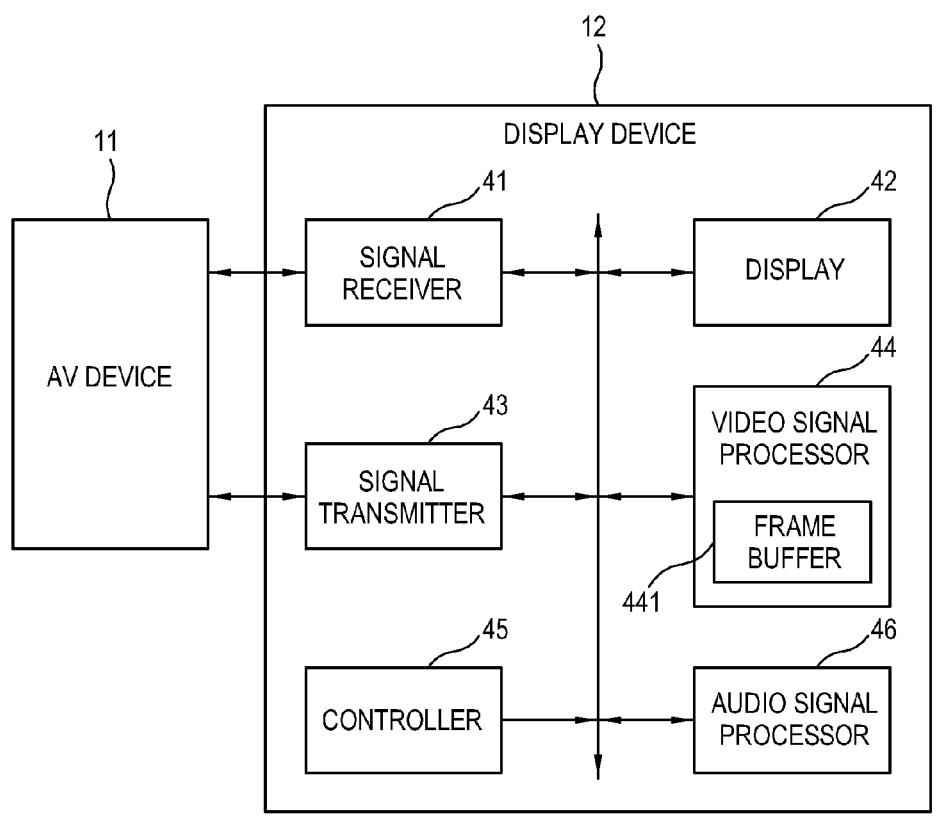
FIG. 4 is a block diagram of a display device according to an exemplary embodiment.

FIG. 4 is a block diagram of a display device 12 according to an exemplary embodiment. As shown in FIG. 4, the display device 12 may include a signal receiver 41, a video signal processor 44, a display 42, an audio signal processor 46, a signal transmitter 43, i.e., a signal output, and a controller 45. The signal receiver 41 may receive the video signal and the first audio signal from the AV device 11.

The video signal processor 44 performs the image processing with regard to the video signal received by the signal receiver 41. The image processing performed in the video signal processor 44 may, for example, include modulation, demodulation, multiplexing, demultiplexing, analog-to-digital conversion, digital-to-analog conversion, decoding, encoding, scaling, etc. The video signal processor 44 performs the image processing for frames included in the video signal. The video signal processor 44 may further include a frame buffer 441 that stores the frames of the video signal. The video signal processor 44 temporarily stores the respective frames in receiving order in the frame buffer 441 and sequentially applies predetermined image processing with regard to the respective frames in such a manner that, if the image processing is completed with regard to the stored frame, the image processing is performed with regard to the next frame. In this case, it may take more time to process the video signal than time to process the first audio signal.

The display 42 displays an image based on the video signal processed by the video signal processor 44. The display 42 may display the image by various types such as a liquid crystal display (LCD), a plasma display panel (PDP), an organic light emitting diode (OLED), etc. The audio signal processor 46 performs the sound processing with regard to the first audio signal received by the signal receiver 41. The signal transmitter 43 transmits the feedback signal of the first audio signal processed by the audio signal processor 46 to the AV device 11. The signal transmitter 43 may transmit the feedback signal of the first audio signal to the AV device in accordance with various standards, such as, as a non-limiting example, Sony/Philips Digital Interface (S/PDIF).

The controller 45 controls the feedback signal of the first audio signal output through the signal transmitter 43 to be output as being synchronized with the video signal processed by the video signal processor 44. For example, the controller 45 may delay the feedback signal of the first audio signal to be synchronized with the video signal in accordance with the time taken to perform the image processing of the video signal in the video signal processor 44. Specifically, the controller 45 may synchronize and match the frame of the video signal with a corresponding sound portion of the first audio signal. The controller 45 may use predetermined index information included in the video signal and first audio signal to synchronize the frame with its corresponding sound portion of the first audio signal.

Figure 5:
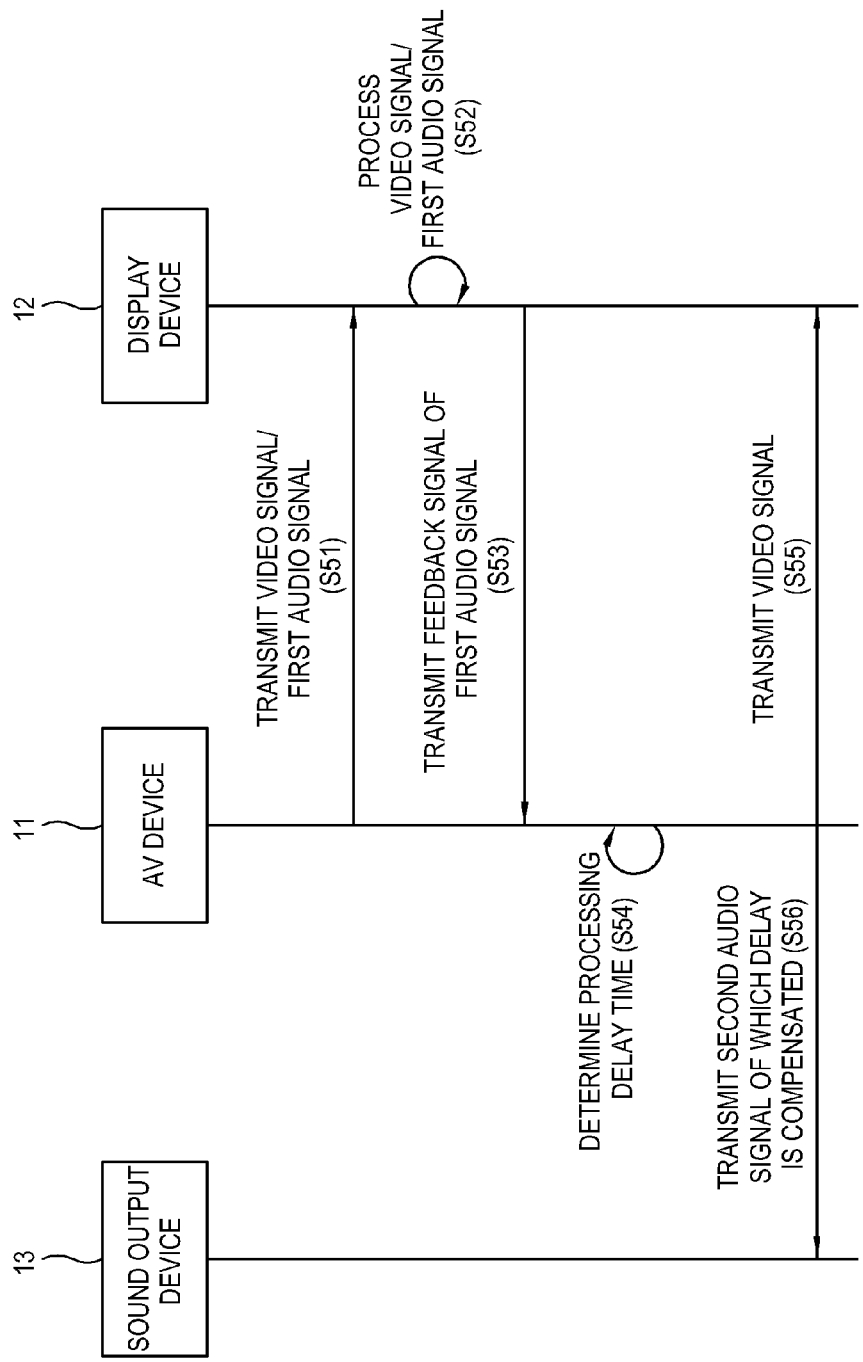
FIG. 5 illustrates operations between the AV device and the display device according to an exemplary embodiment.

FIG. 5 illustrates operations between the AV device and the display device 12 according to an exemplary embodiment. First, at operation S51, the AV device 11 transmits the video signal and the first audio signal to the display device 12. Next, at operation S52, the display device 12 applies the image processing to the video signal to display an image based on the video signal, and processes the first audio signal to be synchronized with the video signal. Next, at operation S53, the display device 12 transmits the feedback signal of the synchronized first audio signal to the AV device 11. Next, at operation S54, the AV device 11 determines the processing delay time of the display device 12, based on the first audio signal output from the display device 12 and the feedback signal of the first audio signal received from the display device 12. Next, the AV device 11 transmits the video signal to the display device 12 at operation S55, and transmits the second audio signal, which is obtained by compensating for the delay based on the determined processing delay time, to the sound output device 13 at operation S56.

Figure 6:
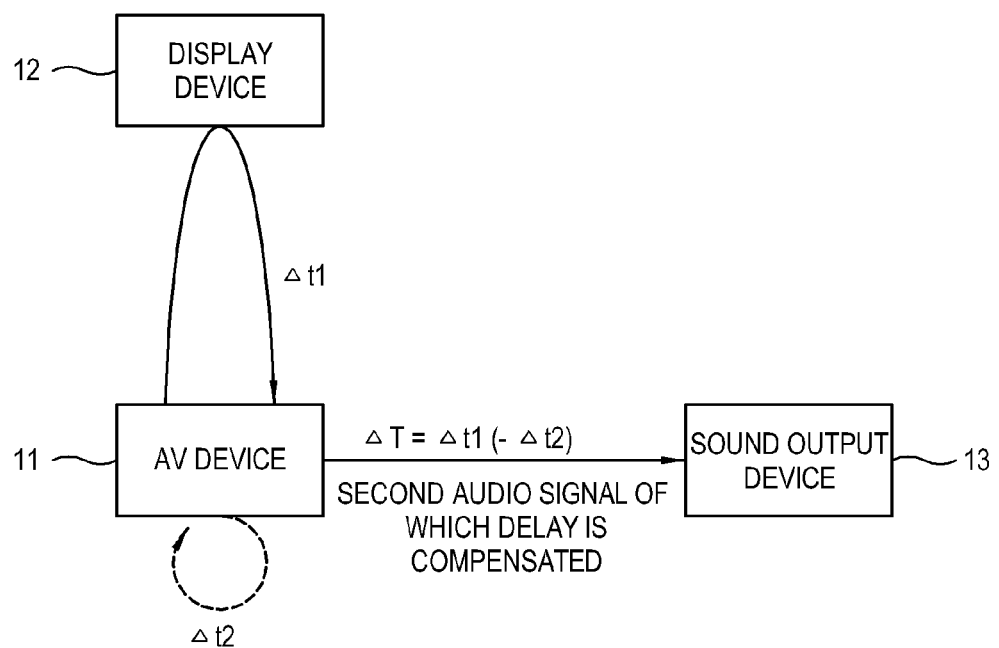
FIG. 6 illustrates an example of the AV device compensating for a delay according to an exemplary embodiment.

FIG. 6 illustrates an example of the AV device 11 compensating for a delay according to an exemplary embodiment. In this exemplary embodiment, a processing delay time $\Delta t1$ refers to time taken by the AV device 11 to output the first audio signal to the display device 12 and receive the feedback signal of the first audio signal from the display device 12. That is, the processing delay time $\Delta t1$ corresponds to time taken by the display device 12 to perform the image processing with regard to the video signal. The processing delay time $\Delta t1$ may be determined by measuring a difference in time between a certain point of the first audio signal output from the AV device 11 to the display device 12 and a corresponding point of the feedback signal of the first audio signal received from the display device 12 by the AV device 11. The processing delay time $\Delta t1$ may vary depending on the content type, resolution of an image based on the video signal, the kinds or methods of the image processing, the characteristics or performance of the display devices 12, etc. For example, the processing delay time $\Delta t1$ may range from several tens to hundreds of milliseconds (msec). If the processing delay time $\Delta t1$ is determined, the AV device 11 outputs the second audio signal, which is obtained by compensating for the delay based on the processing delay time $\Delta t1$, to the sound output device 13. For example, if the processing delay time $\Delta t1$ is 100 msec, the AV device 11 outputs the second audio signal to the sound output device 13 delayed by as much as 100 msec in comparison to the video signal output to the display device 12.

According to an additional exemplary embodiment, the AV device 11 may apply sound processing to the second audio signal. In this case, as shown in FIG. 6, a processing delay time $\Delta t2$ may be taken in the sound processing of the second audio signal. The AV device 11 may perform delay compensation $\Delta T$ with regard to the second audio signal by subtracting the processing delay time $\Delta t2$ of the second audio signal from the processing delay time $\Delta t1$ of the display device 121. For example, if the processing delay time $\Delta t1$ is 100 msec and the processing delay time $\Delta t2$ is 10 msec, the AV device 11 outputs the second audio signal to the sound output device 13 delayed by as much as 90 msec in comparison to the video signal output to the display device 12.

Figure 7:
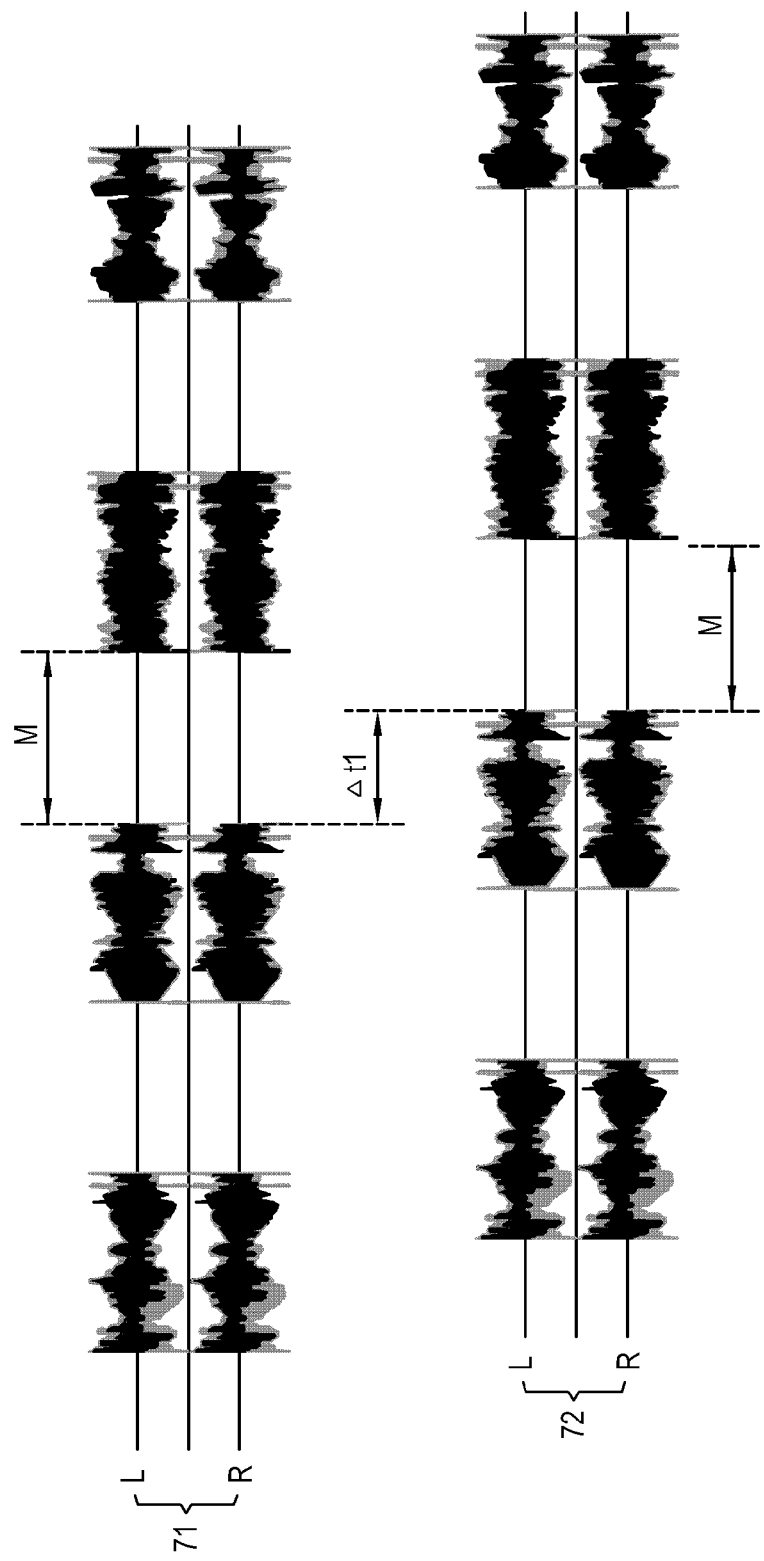
FIG. 7 illustrates waveforms of a first audio signal output from the AV device according to an exemplary embodiment and its feedback signal.

The AV device 11 may pattern the first audio signal to be output to the display device 12, thereby more effectively performing the comparison between the first audio signal and the feedback signal. That is, the first audio signal output from the AV device 11 to the display device 12 may include at least one discrimination section for discriminating a certain point of the first audio signal. The discrimination section may have a periodic pattern. The AV device 11 may determine the processing delay time based on difference in phase between the first audio signal and its feedback signal with respect to the discrimination section. FIG. 7 illustrates waveforms of the first audio signal output from the AV device 11 according to an exemplary embodiment and its feedback signal. As shown in FIG. 7, the AV device 11 may output a first audio signal 71 having the discrimination section M to the display device 12. Signs L and R indicate left sound and right sound of the stereo-type first audio signal 71, respectively. The discrimination section M of the first audio signal 71 may refer to a section from which sound is eliminated. The AV device 11 may generate the first audio signal 71 having the discrimination section M by eliminating the sound from the audio signal received from the source device 14 in a predetermined period. Although only sound channels, L and R, are illustrated, this is merely an example and exemplary embodiments may use a single channel or three or more sound channels.

As shown in FIG. 7, the AV device 11 may receive a feedback signal 72 of the first audio signal 71 from the display device 12. Likewise, the feedback signal 72 of the first audio signal 71 has the discrimination section M like the first audio signal 71. The AV device 11 can determine the processing delay time $\Delta t1$ of the display device 12 by measuring difference in phase between a certain discrimination section M of the first audio signal 71 and the corresponding discrimination section M in the feedback signal 72 of the first audio signal 71. While measuring the difference in phase between the first audio signal 71 and the feedback signal 72, certain corresponding points may be selected within the discrimination sections M of both signals. For example, a starting point, an ending point and a middle point, etc. of the discrimination section M may be used as the certain corresponding point.

Thus, in the AV device 11 according to an exemplary embodiment, the discrimination section M is used to compare the first audio signal 71 with its feedback signal 72, thereby more effectively measuring the difference in phase between the first audio signal 71 and its feedback signal 72. Also, the discrimination section M may be periodically provided, so that the difference in phase between the first audio signal 71 and its feedback signal 72 can be measured with higher reliability even though the characteristics of the display device 12 causes the feedback signal 72 to have an irregular output pattern.

According to another exemplary embodiment, the AV device 11 may measure the difference in phase between the first audio signal 71 and its feedback signal 72 multiple times, and employ an average value of the values obtained by measuring the difference multiple times, thereby improving the reliability of the measurement. Also, as the difference in phase between the first audio signal 71 and its feedback signal 72 is measured multiple times, it is possible to more clearly discriminate between a section where the sound is not originally presented and a section from which the sound is eliminated.

The AV device 11 outputs the first audio signal to the display device 12 when an audio change occurs, and receives its feedback signal to thereby determine the processing delay time. For example, when a user requests for reproduction of contents, the AV device 11 determines that the audio change occurs. Referring back to FIG. 2, the AV device 11 may further include a user input receiver 25 to receive a user's input. The AV device 11 may receive a request for reproducing contents from a user through the user input receiver 25. According to another exemplary embodiment, the AV device 11 may determine that audio change occurs when there is a change in the video signal or audio signal received from the source device 14. For example, if a user's request for reproducing contents is input in the source device 14, the corresponding video signal or audio signal is also changed. Thus, the AV device 11 detects this change and determines that the audio change occurs. Thus, the AV device 11 determines the processing delay time in real time when an audio change occurs, and performs the delay compensation for the audio signal, thereby improving a user' convenience.

In addition, the AV device 11 may determine a processing delay in response to a user's request to perform the delay compensation. The request may be received through the user input 25.

As described above, according to an exemplary embodiment, the delay compensation is performed with higher accuracy and reliability when the video signal and the audio signal are output.

Also, according to an exemplary embodiment, the delay is effectively compensated even though it is varied depending on types of contents to be reproduced, resolution, and characteristics of devices, when the video signal and the audio signal are output.

Also, an apparatus according to an exemplary embodiment, one or more of the components may be provided as software, hardware, or a combination of software and hardware. The software components may be executed on a general processor or a specialized processor.

Also, a non-transitory computer readable medium may have stored thereon instructions for executing a method according to an exemplary embodiment.

Although a few exemplary embodiments have been shown and described, it will be appreciated by those skilled in the art that changes may be made in these exemplary embodiments without departing from the principles and spirit of the inventive concept. Therefore, the foregoing has to be considered as illustrative only. The scope of the invention is defined in the appended claims and their equivalents. Accordingly, all suitable modification and equivalents may fall within the scope of the invention.

What is claimed is:

1. An audio/video (AV) device comprising:
a first signal transmitter configured to output a video signal and a first audio signal corresponding to the video signal to a display device;
a first signal receiver configured to receive a feedback signal of the first audio signal from the display device;
a second signal transmitter configured to output a second audio signal corresponding to the video signal; and
a controller configured to determine a processing delay time of the display device by comparing the first audio signal and the feedback signal, and control the second signal transmitter to delay the output of the second audio signal based on the determined processing delay time,
wherein the controller is further configured to form a mute section in the first audio signal, to detect the mute section from the feedback signal with respect to the first audio signal received from the display device, and to determine the processing delay time based on a time difference between a point of time when the mute section of the first audio signal is outputted and a point of time when the mute section is detected from the feedback signal.

2. The AV device according to claim 1, wherein the mute section is periodically provided in the first audio signal.

3. The AV device according to claim 1, wherein the mute section formed in the first audio signal has a pattern.

4. The AV device according to claim 1, wherein the controller is further configured to control the first signal transmitter to output the first audio signal in response to an audio change occurring.

5. The AV device according to claim 4, wherein the controller is further configured to determine that the audio change occurs in response to a user's input being received.

6. The AV device according to claim 4, further comprising a second signal receiver configured to receive the video signal and the audio signal from a source device,
wherein the controller is further configured to determine that the audio change occurs in response to the received video signal or audio signal being changed.

7. The AV device according to claim 1, further comprising a signal processor configured to process the second audio signal,
wherein the controller is further configured to control the second signal transmitter to output the second audio signal based on a processing delay time of the display device and a processing delay time of the signal processor.

8. The AV device according to claim 1, wherein the first signal receiver complies with a Sony/Philips Digital Interface (S/PDIF) standard.

9. A method of controlling an audio/video (AV) device, the method comprising:
outputting a video signal and a first audio signal corresponding to the video signal to a display device;
receiving a feedback signal of the first audio signal from the display device;
determining a processing delay time of the display device by comparing the first audio signal and the feedback signal; and
outputting a second audio signal corresponding to the video signal, the second audio signal being delayed based on the determined processing delay time,
wherein the outputting the video signal and the first audio signal further comprises forming a mute section in the first audio signal, and
wherein the determining comprises detecting the mute section from the feedback signal with respect to the first audio signal received from the display device, and determining the processing delay time based on a time difference between a point of time when the mute section of the first audio signal is outputted and a point of time when the mute section is detected from the feedback signal.

10. The method according to claim 9, wherein the mute section is periodically provided in the first audio signal.

11. The method according to claim 9, wherein the mute section formed in said first audio signal has a pattern.

12. The method according to claim 9, wherein the outputting the first audio signal comprises outputting the first audio signal in response to an audio change occurring.

13. The method according to claim 12, wherein the outputting the first audio signal comprises determining that the audio change occurs in response to a user's input being received.

14. The method according to claim 12, further comprising receiving the video signal and the audio signal from a source device, wherein the outputting the first audio signal comprises determining that the audio change occurs in response to the received video signal or audio signal being changed.

15. The method according to claim 9, further comprising processing the second audio signal, wherein the outputting the second audio signal comprises outputting the second audio signal based on a processing delay time of the display device and a processing delay time of the second audio signal.

16. The method according to claim 9, wherein the receiving the feedback signal comprises receiving the feedback signal complying with a Sony/Philips Digital Interface (S/PDIF) standard.

\* \* \* \* \*